May 1, 1956 — J. R. OISHEI — 2,743,473
COMBINED WASHER AND WINDSHIELD CLEANER
Filed July 3, 1952 — 5 Sheets-Sheet 1

INVENTOR.
John R. Oishei,
BY
Beau, Brooks, Buckley & Beau.
ATTORNEYS.

May 1, 1956 J. R. OISHEI 2,743,473
COMBINED WASHER AND WINDSHIELD CLEANER
Filed July 3, 1952 5 Sheets-Sheet 2

INVENTOR.
John R. Oishei,
BY
Beau, Brooks, Buckley & Beau
ATTORNEYS.

May 1, 1956  J. R. OISHEI  2,743,473
COMBINED WASHER AND WINDSHIELD CLEANER
Filed July 3, 1952  5 Sheets-Sheet 3

INVENTOR.
John R. Oishei,
BY
Beau, Brooks, Buckley + Beau.
ATTORNEYS.

May 1, 1956  J. R. OISHEI  2,743,473
COMBINED WASHER AND WINDSHIELD CLEANER
Filed July 3, 1952  5 Sheets-Sheet 4

INVENTOR.
John R. Oishei,
BY
Bean, Brooks, Buckley & Bean
ATTORNEYS.

United States Patent Office 2,743,473
Patented May 1, 1956

2,743,473
COMBINED WASHER AND WINDSHIELD CLEANER

John R. Oishei, Buffalo, N. Y., assignor to Trico Products Corporation, Buffalo, N. Y.

Application July 3, 1952, Serial No. 297,007

36 Claims. (Cl. 15—250.4)

This invention relates to the windshield cleaning field of endeavor and especially to a system by which the windshield surface is jointly acted upon by a solvent applicator and a mechanical wiper to maintain a clear field of vision therethrough.

Automobiles heretofore have been equipped with individual wiper units and washer units each having its own control which served its purpose independently of the other unit and necessitated an individual manipulation. At times, it is desirable to use the two units conjointly which imposes upon the motorist the duty of first turning on one unit and then the other, followed by a subsequent shutting off operation, all of which distracts his attention from the safe driving of the vehicle.

In an earlier patent, No. 2,206,814, these two units have been interconnected for joint operation in response to an initial act on the part of the motorist. Therein a wiper unit is started automatically by the manual retraction of a pump plunger on its liquid intaking stroke. During this stroke a spring is distorted to store up energy for subsequent expenditure, after the release of the plunger, to effect the liquid discharging stroke, and it is just before the end of this discharging stroke that the wiper operation is arrested. The two units are brought to a stop automatically. To wipe the glass dry after wetting and to overcome the indeterminable arrest of the blades in the wiped area, the wiper unit must first be manually turned on and subsequently turned off manually, all of which necessitates three distinct manipulations by the car operator.

In the present invention, an improved coupler and coordinating mechanism is provided to secure the joint operation of the washer and wiper units and to discontinue their operations in a sequential order that prolongs the wiper action for a predetermined extent beyond the washer spray, thereby to leave the field of vision washed and dried, this ultimate goal being obtained by a sole act on the part of the motorist.

The object of this invention is to provide a practical windshield cleaning system wherein a sequential series of washing and wiping operations will be set in motion and determined with a minimum attention from the motorist.

The invention further resides in a unitized control for the cleaning system by which the operation of the washer unit will automatically bring the wiper unit into action initially to spread the liquid solvent over the windshield surface and thereafter to follow with an independent wiping process for an interval sufficient to insure a clear field of vision.

Again, the invention contemplates the provision of a system wherein the washer and wiper units are jointly brought into function automatically with the actuation of the washer control while enabling the independent use of the wiper unit when desired.

Furthermore, an object of this invention is to provide an automatic control capable of coordinating the individual controls for the washer and the wiper in sequence to insure an overlapping period of joint action with an initial wetting and a final wiping to afford a clear field for vision ahead, and further one which can readily be installed in a practical manner and is possessed of a simplicity in design tending toward economy in manufacture.

The foregoing and other objects will manifest themselves as this description progresses, reference being made therein to the accompanying drawing wherein.

Referring more particularly to the drawings, the numeral 1 designates the windshield of a motor vehicle, 2 the cowl therebeneath, and 3 the instrument panel or shelf interiorly thereof.

Figures 1, 2, 3, 4:
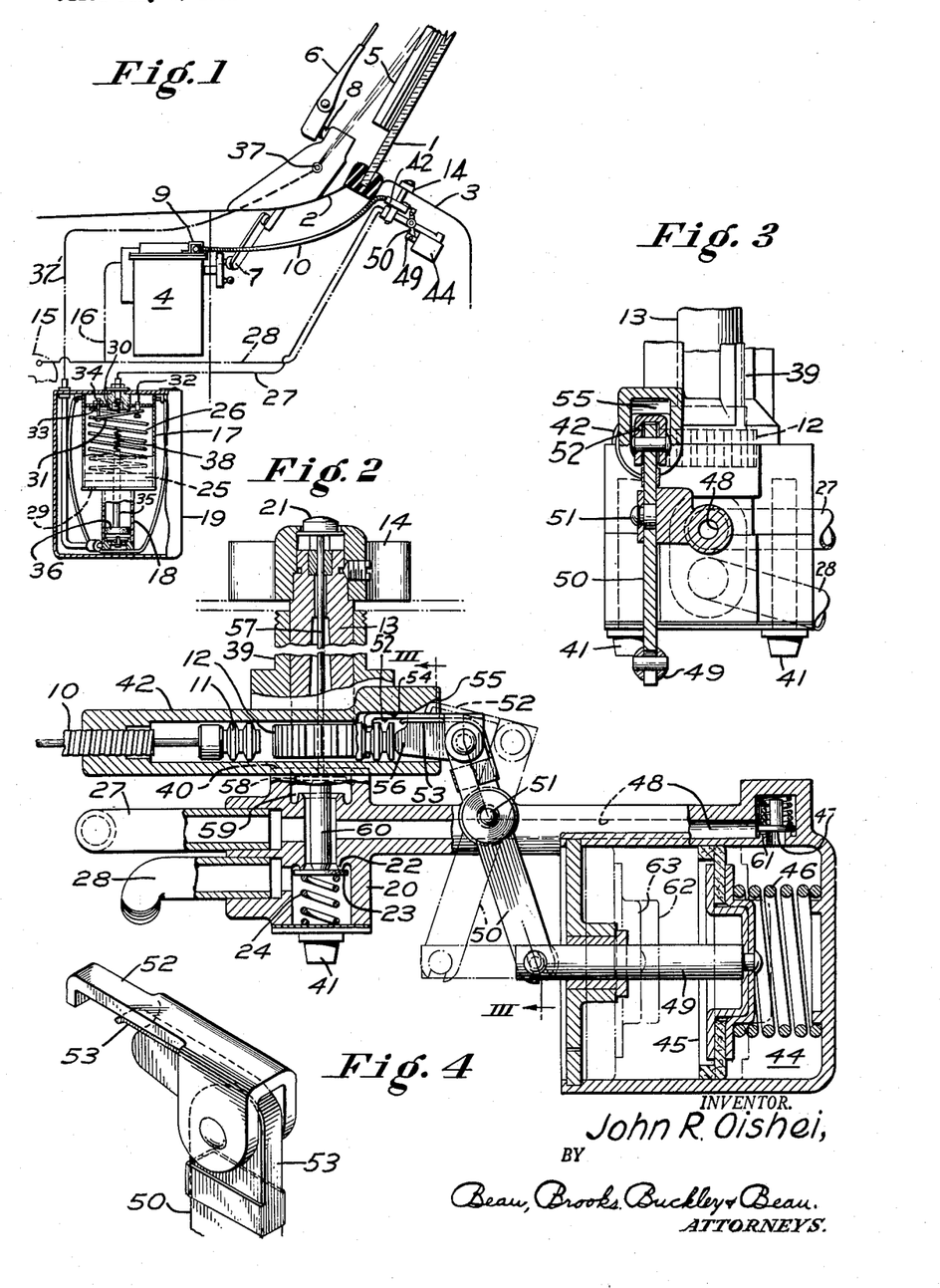
Fig. 1 is a schematic layout of a combined pneumatic system embodying the present invention.
Fig. 2 is an enlarged sectional view of the coordinating disconnect for the combined system.
Fig. 3 is a view thereof as seen about on the line III—III of Fig. 2.
Fig. 4 is a detailed perspective view of the wiper coupling pawl.

The wiper unit comprises a power unit 4, in the form of a pneumatic motor, a wiper 5, its oscillating arm 6, and a connecting transmission 7 of suitable form from the motor to the arm carrying rockshaft 8. The wiper unit has a control, such as a slide valve 9 on the motor, connected by a bowden wire 10, a rack 11 and a pinion 12, to an actuator shaft 13 having a hand knob 14 accessible to the motorist. A suitable source of suction, such as the intake manifold 15, is connected to the slide valve by a conduit 16 and when the wiper is arrested it serves to park the wiper out of the field of vision in a well-known manner. Such a parking arrangement is illustrated in Patent No. 2,617,136, dated November 11, 1952.

The washer unit comprises a power unit 17, a pump 18, a reservoir 19, and a control such as the valve 20 that is depressible by a stemmed button 21 supported axially within the knob 14. The valve casing has a ported seat 22 that is normally closed by a valving disk 23 under the urge of a spring 24. The power unit 17 is preferably in the form of a pneumatic motor having a piston 25 moved in one direction by the pressure differential and returned in the opposite direction by a spring 26. The suction communication is established by the valve 20, being connected thereto by conduit 27. The suction line 28 leads from the suction supply line 16 to the valve so that when the latter is opened by depressing the button 21 the suction influence will evacuate the motor chamber above the piston 25 to create a piston-lifting pressure differential, the underside of the piston being open to the atmosphere through port 29. The conduit 27 opens through a valve seat 30 into the motor chamber 17 and is adapted to be closed by a valve plate 31 mounted by pin 32. An atmospheric vent 33 is normally closed by a valve 34 and is designed for being opened by the plate 31 as it closes upon the seat 30. When this occurs the suction will be cut off and the motor chamber will be vented to permit the outside atmosphere to enter for enabling the spring 26 to function. The motor piston is connected by a rod 35 to the pump plunger 36 for actuating the latter to intake water or other liquid solvent from the reservoir 19 on the suction stroke of the motor and to eject the liquid charge through a conduit 37' and a nozzle 37 onto the windshield by and during the spring actuated stroke. As the motor piston approaches its upper position a spring 38 carried thereby will move the plate 31 to its seat 30 and vent the motor chamber.

The casting forming the casing for the valve 20 may be made integral with the sleeve bearing 39 for the shaft 13 but herein is separable along the line 40, the two parts being held together by screw fasteners 41. The sleeve bearing is also cast with a tubular guide 42 to receive the rack 11. The foregoing is more fully disclosed in earlier Patents Nos. 2,632,471 and 2,634,632.

In the earlier installations just described it was necessary to actuate both controls 14 and 21 in order to have the joint action of the wiper and the washer, either by turning the knob 14 to start the wiper first and then depressing the button 21 to follow with the washer, or by depressing the button to start the washer first and follow this with a manipulation of the knob. Then, after the washer had ceased, it required a reverse knob operation to park the wiper. During practically this entire period the attention of the motorist is more or less distracted from the safe driving of the vehicle.

According to the present invention the wiper unit is brought into operation concurrently, or substantially so, with the washer unit and automatically with the turning on of the washer. Similarly, the wiper unit is arrested and parked automatically with but preferably following the cessation of the liquid delivery by the nozzle 37. Preferably and desirably, the washer unit is energized prior to the wiper operation so that the wiper will have the advantage of a wet surface when it strokes the glass. Likewise, it is preferable and desirable to have the wiper continue to function for a few strokes after the arrest of the delivered liquid spray to more or less dry the surface before parking. The wiping and washing cycles therefore initially follow in a prescribed sequence that is terminated with the automatic arrest of the wiper. This sequence in operation may be changed to initiate the wiper action first, if desired, or the operation may start simultaneously. In any event, the chain of actions will follow a simple manipulation on the part of the motorist, such as by depressing the washer control button 21, more fully now to appear.

To this end there is provided a coordinating coupler or disconnect which, as shown in Fig. 2, embodies a motor for the wiper unit to take over automatically whenever the washer control is manually operated. This control motor comprises a chamber 44, a piston 45, a backing spring 46 for the piston, and a metering check valve 47. In this embodiment, the control motor is depicted as being integral with the valve casting 20, and has a connecting duct 48 in which the check valve is located. The piston is normally uncoupled from the slide valve 9 to leave the latter free for independent manual use but is adapted for connection therewith, and for this purpose the piston is provided with a rod 49 that connects to one end of a lever 50 fulcrumed on the valve casting at 51. This lever pivotally carries a coupling pawl or connector 52 for detachably interlocking with the control actuating rack 11 to couple the piston 45 to the slide valve 9 for such automatic action. The pawl is held disengaged with the actuator 11 by a spring 53 suitably anchored to the lever, as by wrapping it thereabout. When the rack is withdrawn to a wiper parking or arresting position the spring will lift the pawl to free the rack for future manual actuation. The tubular guide 42 is extended and formed with a lengthwise groove 54 in which the pawl 52 may slide when the rack is being motor driven. The outer end of the groove opens onto a cam face 55 which, when the washer is operated, will be engaged by the raised pawl to depress it for interlocking the motor with the rack. In order to insure the rack being in proper position for pawl engagement, the pawl has a positioning cam 56 which, during the descent of the pawl, is designed to preliminarily engage the end of the rack and shift it axially, if need be, to a position for receiving the pawl between its teeth.

In operation, the wiper alone may be brought into operation during rainy weather simply by turning the knob 14, in the customary manner. At other times, when it is desired to use the washer unit to remove vision-obscuring matter from the windshield, it is only necessary to depress the washer control button 21 and its stem 57 to move valve 58 to its seat 59 for closing off the atmosphere and, by the spacer 60, to unseat the valve 23 for opening the suction communication, whereupon the motors 17 and 44 will come into operation. This produces a dual operation, namely, to lift the washer piston and its connected pump plunger for intaking a charge of liquid from the reservoir and to energize the control motor for moving the slide valve 9 to start the wiper in operation. This will initiate the wiper operation ahead of the liquid spray. At the end of the intake stroke of the pump, the washer motor piston will open the atmospheric vent by unseating valve 34 and close off the supply of suction by seating the valve 31, whereupon the spring 26 will drive the motor piston and pump plunger downward for a predetermined time interval to deliver the charge of liquid from the nozzle 37 into the wiper path on the windshield.

After the pump has completed its delivery stroke, the wiper will continue to operate for a definite time interval to dry the glass surface. This time interval may be determined by metering the admission of air behind the piston 45 to retard and control its spring-return motion. The release of the button, after the venting of the washer motor which admits air to the system, enables the atmospheric valve 58 to open for the admission of more air, but the flow of air behind the piston is restricted by a bleed passage 61 beneath the check valve. If desired, the piston movement may be accelerated momentarily and immediately prior to parking the wiping blade, as by means of a bypass (not shown) about the piston. When the piston has moved to the position indicated by the broken line 62 the wiper will be parked, and thereafter the piston movement to its normal position 63 will enable the pawl spring 53 to release the rack for future independent actuation of the wiper alone. This arrangement constitutes a time controlled unit to function for a predetermined time interval and insures the field of vision being wiped comparatively dry without further attention on the part of the motorist. The initial operation of the button 21 constitutes the sole maneuver that requires the attention of the motorist. Thereafter, the sequence of operations that are necessary to bring the washer and cleaner units into conjoint action and finally to arrest them, will follow in an automatic manner.

In this connection it will be noted that the pump of the washer unit also has a definite time interval of operation. In the particular embodiment the pump has an intake stroke, during which the wiper unit is energized, and a discharge stroke wherein there is dual operation of the two units. By reason of the coordinating disconnect unit the washer button 21 becomes a secondary control for the wiper unit wherein the latter operates with the washer and its operation is continued over after the washer ceases. The auxiliary motor 44, 45 therefore, acting in the capacity of a dash pot serves as a hold-over means for continuing the wiper operation. Again, it will be noted that, when the wiper is in operation and has been set by the knob 14 to adjust the actuator 11 for a given wiper speed less than its maximum, the washer may be brought into play for its predetermined period of activity during which the maximum wiper speed will be called for by reason of the fact that the pawl 52 will engage a corresponding tooth of the rack, but when the hold-over device restores the pawl it will release the rack tooth at the preset wiper speed.

An alternate structure is shown in Figs. 5 through 10, wherein a bellows member is employed to provide a means of drawing the liquid solvent from a reservoir and discharging it by and upon the building up of a predetermined hydrostatic pressure within the bellows through the application of a directed pressure upon the liquid-filled bellows to distend the side wall of the latter. For this purpose, a pump in the form of a bellows 65 is provided, the same being made of rubbery material and having a chamber open at its bottom side to receive an anchoring head 66 of a tubular mounting shank 67. The shank may be secured in a bracket 68 having ears 69 extending therefrom to support, by means of a pivot pin 70, a lever member 71 of sufficient length to secure approximately a two-to-one mechanical advantage or other desired leverage thereby to enable a quick compression of the bellows for so distending its side wall 73. By this arrangement wherein the side wall 73 yields or distends somewhat, as indicated by the broken lines in Fig. 7, under a predetermined hydrostatic pressure the bellows is converted into a spring motor to continue the liquid displacement through a connected nozzle 72 as long as the lever is held depressed and until the rubber spring has spent itself. The discharge of the liquid solvent onto the windshield through a restricted outlet duct 78 prolongs the delivered spray for a definite time interval and the elasticity of the distensible wall 73 will act to regulate the delivery pressure until the energy stored up in the distended wall expends itself. The central area of the top diaphragm portion of the bellows is thickened to provide in nature a plunger 74 which, when depressed, will serve as a liquid displacing member and create a hydrostatic pressure sufficient to maintain a spray upon the windshield for several seconds of time.

Figure 7:
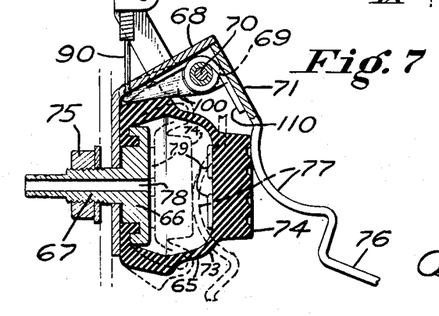
Fig. 7 is a sectional view through the washer unit.
Figure 10:
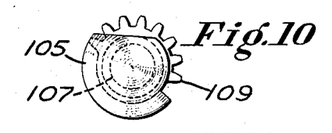
Fig. 10 is a detail end view of the manual control for the windshield cleaner.

Preferably the bracket, the bellows and the lever are mounted as a unit by inserting the shank 67 through an opening in the firewall and securing it in a suitable manner, as by a clamp nut 75. From such location the lever 71 extends downwardly in the form of a pedal 76 to receive the pressure from the toe portion of the foot. The lever has a balled part 77 bearing upon the plunger 74 to depress it into the bellows chamber and down upon the anchoring head 66. To avoid closing off the outlet duct 78 the under face of the plunger may be formed with clearance ribs 79. Thereby the liquid within the expanded bellows will find its way to the delivery duct and through the connecting conduit 80 to the nozzle 72, suitable inlet and outlet valves 81 and 82 providing for unidirectional liquid flow from the reservoir 83.

In use, the pedal serves as the actuator and control for the pump and by it the plunger 74 may be depressed rapidly to cause the distensible wall portion 73 to bulge under the hydrostatic pressure. This action will cause the liquid to escape through the restricted passage 78 and discharge onto the windshield under the motive power of the distended rubber wall and for the time interval determined by the restoration of such side wall to its normal though collapsed state unless the motive power has been previously discontinued by relieving the foot power. With the foot pressure removed, the pedal will return to its normally elevated position under the urge of the bellows and the assistance of an applied spring pressure.

Figures 5, 8, 9:
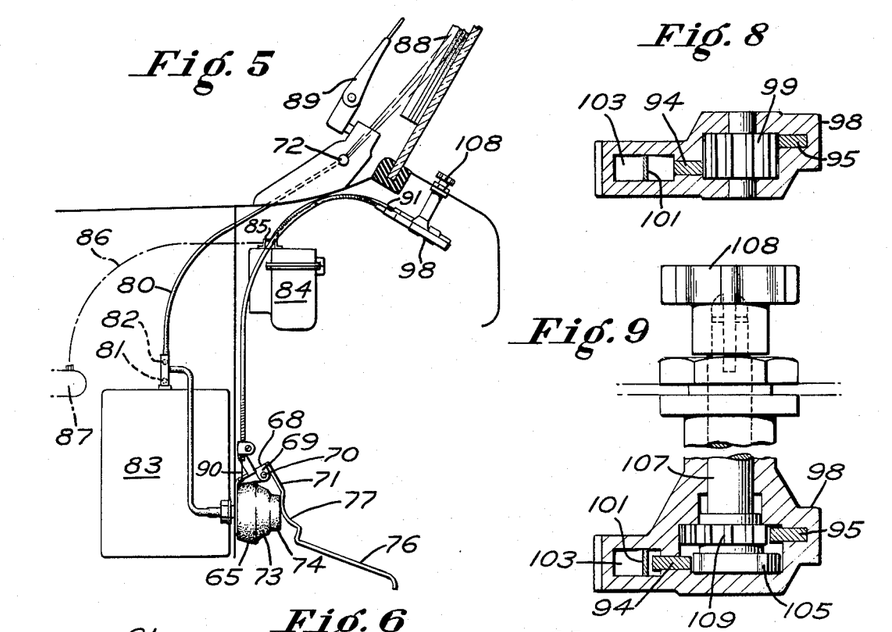
Fig. 5 is a view similar to Fig. 1 showing a pedal controlled system embodying the present invention.
Figs. 8 and 9 are sectional views about on line VIII—VIII and IX—IX of Fig. 6, respectively.

The windshield cleaner motor 84 has its control valve 85 interposed in the suction line 86 that leads to the intake manifold 87. The motor is operatively connected to the wiper 88 by a suitable transmission (not shown) acting through the wiper arm 89.

Figure 6:
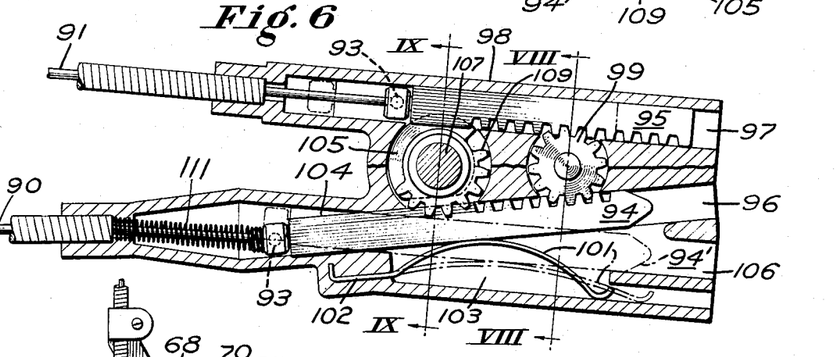
Fig. 6 is a longitudinal sectional view through a modified disconnect thereof.

To coordinate the two controls 76 and 85, there is interposed a coordinator or coupler shown more particularly in Fig. 6. This coordinating unit operatively connects the two controls to compel wiper performance whenever the washer is called upon, unless the wiper is already in operation. In this modification, the pedal will compress the bellows immediately and start the water flow before wiper oscillation. The coordinator also embodies a disconnect feature which enables the wiper to be operated independently of the washer.

In the illustrated embodiment of Fig. 6, the coordinator incorporates disconnect features and comprises a flexible link 90 operatively joined to the washer control and a flexible link 91 operatively joined to the wiper control. The two flexible links may each consist of a bowden wire and a rack bar joined thereto by a swivel joint 93. The two rack bars 94 and 95 are slidable in the guideways 96 and 97 in a gear case 98 and are interconnected by a pinion or connector 99 to transmit power to one from the other. The flexible wire 90 is connected to a rocker arm 100 on the lever 71 so that when the pedal is depressed to start the washer, the connected bowden wire will slide the rack 94 and, through the pinion 99, also the rack 95 to shift the wire 91 and actuate the motor control in starting the wiper. The wiper will continue to operate as long as the pedal is held depressed, even after the washer has spent itself, to insure the windshield being wiped dry after the washing.

The disconnect feature embodies means for disrupting the transmission 94, 95, 99 to permit the independent operation of the wiper and to enable the individual operation of the washer when the wiper is already in use. For example, in a light rain insufficient of itself to thoroughly wet the glass for a smooth wiper operation, it may be desirable to supplement the rain drops with one or more squirts from the nozzle 72. To this end, the washer rack 94 is mounted for being unmeshed from the pinion against the urge of a bowed spring 101 anchored at 102 in a pocket 103 of the gear case. Overlying a smooth longitudinal bearing edge 104 of this rack is a rack-displacing cam 105 which when moved will cam upon the bearing edge and depress the rack to the broken line position 94' out of mesh with the pinion. In its displaced position, the rack will idly slide when the pedal is depressed for the independent use of the washer. The cam is fixed to a shaft 107 to be rotated therewith by a knob 108. Also fixed on this shaft is a segmental gear 109 which is normally free of the wiper rack 95 but is adapted to be meshed therewith when the shaft is turned. Consequently, an additional increment of movement of the shaft, after mesh, will actuate the wiper control to set the wiper in operation. The cam and the segmental gear are appropriately arranged in order on the shaft to initially disengage the rack 94 by the cam and then to mesh the gear with the rack 95 to slide it.

The option is provided either for using the wiper alone without the pump, as during a rain, at which time the washer may also be actuated alone, or for using the wiper and the pump conjointly as in dry weather, in which event the two elements are linked together to cause the pump means to automatically bring the wiper means into operation. On the other hand, the wiper coupler means may be employed not only to start and stop the wiper but also to automatically disconnect the pump, whereupon the operation of the pump will become entirely independent of the operation of the wiper.

A spring 110 is provided to arrest the wiper automatically after the removal of the foot pressure. A lighter compression spring 111 may be arranged in the gear case to assist the pedal in shifting the washer rack 94 thereby to relieve the flexible wire 90 of some of the pedal-applied force that would otherwise be required to push the rack. The spring 110 dominates the compression spring 111 to restore the dual system for its next use, and as long as the pedal is held depressed the wiper will continue its operation following the termination of the liquid spray. The pedal therefore serves as another medium by which the wiper may be set in operation, one actuator 108 being remotely placed from the other actuator 76 to enable the wiper to be operated either by the hand, or by the foot with automatic releasing means.

Figure 11:
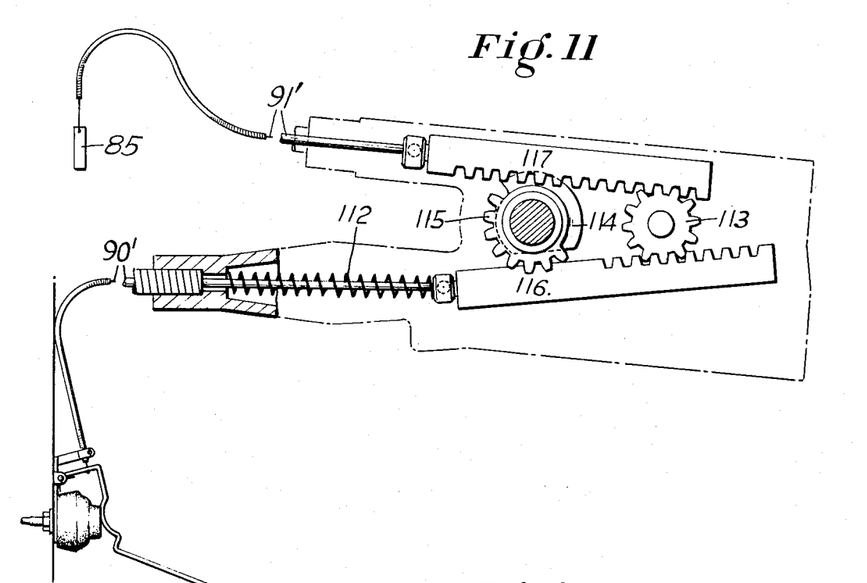
Fig. 11 is a diagrammatic view of a further modification.

In the embodiment shown in Fig. 11, the arrangement is such that the pedal will exert a rack-actuating pull upon the bowden wire in one direction while on the return stroke a compression spring 112 in the gear case will exert a pull upon the wire and pedal. In Fig. 6, the wiper rack exerts a push upon the flexible link 91 to open the wiper control valve. In Fig. 11, the wiper rack exerts a pull upon the flexible link 91' for the like reason. Otherwise, the modified construction is substantially similar to the disclosure of Fig. 6, the same having a rack-connecting pinion 113 and a rack-displacing cam 114 which latter upon being rotated will mesh the segmental gear 115 with the wiper rack to effect independent wiper operation. The washer rack 116 is actuated by a pull link 90' while the link 91' is pulled upon by the wiper rack 117 to turn on the wiper motor.

Figure 12:
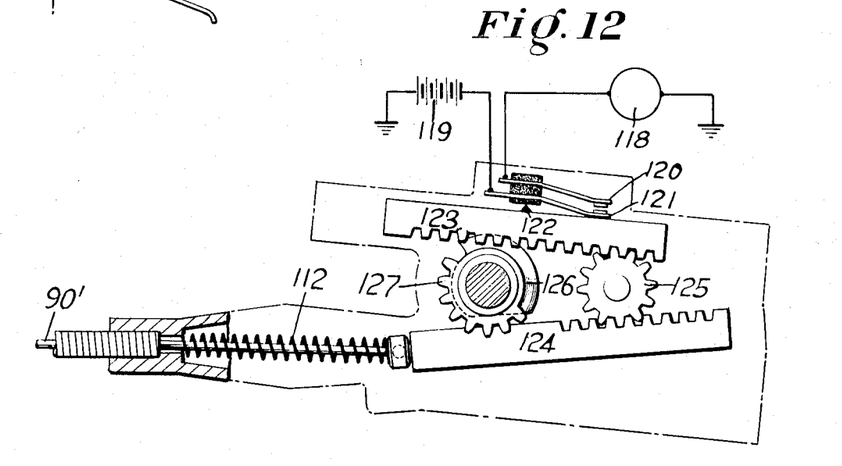
Fig. 12 is a similar view of a still further embodiment.

In Fig. 12, the present invention has been embodied in an electric windshield cleaner having a motor 118 connected in circuit with the battery 119, the circuit including switch contacts 120 and 121 which when closed will bring the wiper into operation and when opened will arrest the wiper. For closing the switch there is provided a cam lug 122 carried by but suitably insulated from the wiper rack 123. This rack forms a part of the coordinating disconnect unit and is operable from the washer rack 124 through a connecting pinion 125. To secure the independent wiper operation, the disconnecting cam 126 is rotated to displace the washer rack from the pinion and to mesh the segmental gear 127 with the lug-carrying wiper rack 123 to enable the manual and independent actuation of the latter.

Figure 15:
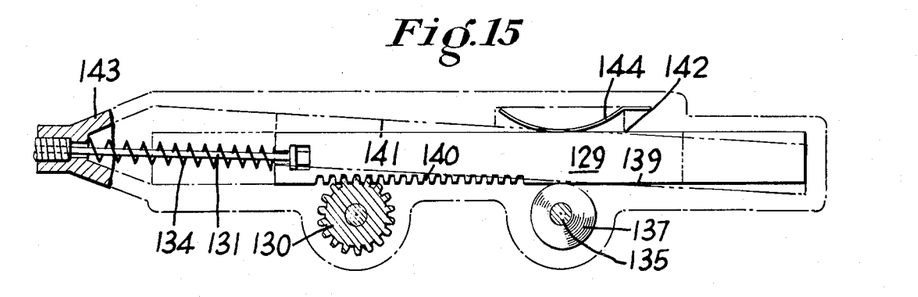
Figure 16:
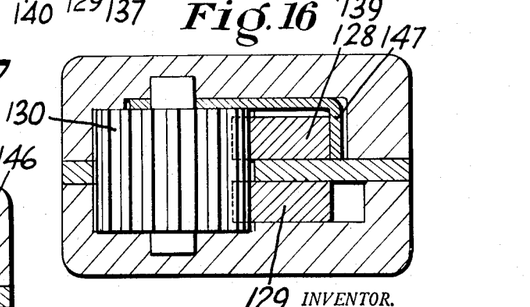
Figs. 16 and 17 are cross sectional views about on lines XVI—XVI and XVII—XVII of Fig. 14.
Figure 17:
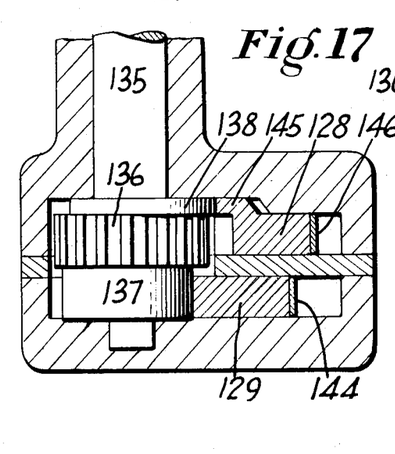

In the modification of Figs. 13 through 17, the wiper rack 128 and the washer rack 129 are arranged on the same side of the intermeshing and power transmitting pinion 130 so that when the pedal is depressed to exert a pull upon the bowden wire 131 the washer rack will slide to its triple dot and dash position, Fig. 15, and, through the pinion, shift the wiper rack to exert a push upon its bowden wire 132 to actuate the wiper control. This action will serve to compress the spring 134 which, upon the removal of the foot pressure, will restore the racks to their normally inoperative positions.

For manually controlling the wiper operation independently of the washer, there is provided a hand knob shaft 135 which carries a pinion 136 for meshing with the wiper rack 128. When the shaft is rotated it will slide the wiper rack to turn the wiper on or off. Also fixed on this hand-turned shaft are two cams 137 and 138 having active portions which are angularly displaced at about ninety degrees the one from the other. The cam 137 is designed to engage a flat face 139 upon the washer rack bar to lift its toothed portion 140 out of mesh with the pinion 130, as shown by the double dot and dash line position 141 in Fig. 15. This disengagement is effected by causing the rack bar to fulcrum upon the part 142 of the gear case 143 to lift the rack portion against the action of spring 144 and thereby free the washer rack from the pinion 130. The washer may then be actuated by itself and as often as desired without disturbing an operating windshield cleaner, the washer rack idly sliding upon the supporting cam 137.

The wiper cam 138 is laterally offset from the wiper actuating gear 136 to act upon a side rail 145 in lifting the wiper rack 128 against its spring 146 out of mesh with the hand pinion 136 thereby to avoid the hand knob or its shaft turning whenever the combined system is actuated by the foot. The guiding strap 147 acts to maintain the wiper rack in mesh with the pinion 130 at all times during its rocking action.

Figures 18, 19, 21:
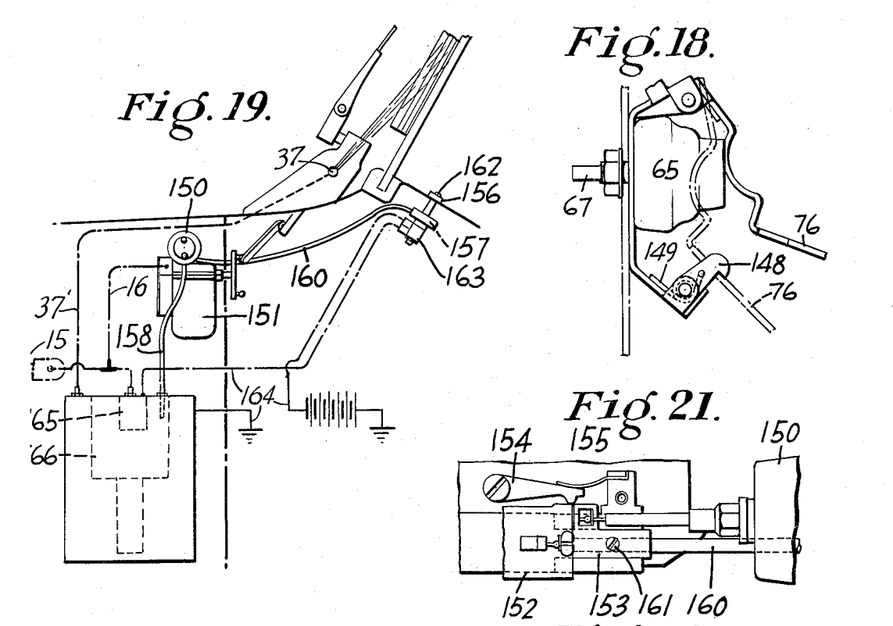
Fig. 18 is a detail of the pedal holding latch.
Fig. 19 is a diagrammatic view of a further installation.
Figs. 21, 22 and 23 are schematic views of the disconnect or control coupler in its three positions.

A time delay unit, such as a dash pot somewhat similar to the retarding motor 44, 45, may be associated with the pedal to retard its return and thereby insure wiping continuance for a definite period after the washing operation. Or, other hold-over means may be provided, such as the latch 148, Fig. 18, which is designed to engage the pedal 76 to hold it depressed until it is disengaged by the toe of the foot against the urge of a spring 149.

Figures 20, 22, 23:
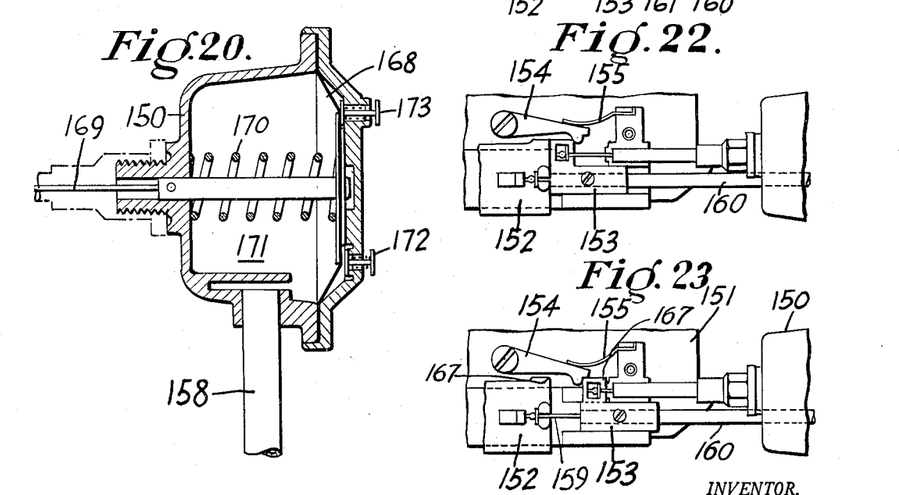
Fig. 20 is a sectional view of the modified hold-over auxiliary motor.

Figs. 19 through 23 show a further embodiment that is similar to that of Figs. 1 through 4 in that a control motor or power actuator 150 forms a part of the coordinator or disconnect unit for turning on the wiper when the washer is actuated. In this embodiment, a suction operated windshield cleaner motor 151 has its control valve 152 directly connected to the power actuator 150 which latter is mounted upon the wiper motor to facilitate the installation of the combined wiper and washer system on the vehicle. Interposed on the wiper motor between the control valve and its power actuator is the coupler slide or connector 153 which is detachably connected to the valve, as by bearing directly thereon, and is designed for being engaged by a pawl or dog 154 that is depressed by a spring 155 to hold the slide arrested against power actuation whenever the wiper is turned on manually. As in Fig. 2, the hand actuator comprises a hand knob 156 for acting through a rack and pinion 157 and a bowden wire unit including a push-pull wire 159 and a flexible inclosing armor 160. The armor is fixed in a seat on the slide 153 by a fastener 161 while the wire is suitably secured to the control valve 152. Consequently, when the hand knob is turned to bring the wiper into use the control valve, which normally holds the pawl inoperative, moves from its normally parked position of Fig. 21 and from under the pawl to release it to its slide holding position as shown in Fig. 23. A reverse turn of the hand knob will arrest the wiper.

When the washer and wiper are to be used together, the washer button or actuator 162 is depressed to close the washer circuit switch 163, which is connected in electric circuit connections 164 with an electro-magnetic control valve 165 for the suction actuated washer pump unit 166 and the washer will operate. The washer unit is similar to that shown in Fig. 1 except that the suction valve is electrically opened instead of manually. This electrically controlled washer unit is more fully disclosed in copending application Serial No. 323,902.

This will open the washer spring motor 166 to the source of suction and concurrently establish a suction communication with the power actuator 150 through a conduit 158. The actuator is preferably a fluid motor and has a fluid displacing member in the form of a diaphragm 168 which is connected to the coupler slide by a link 169 and is normally retracted by a spring 170. Or, in lieu of the diaphragm type of power actuator, a cylinder like in Fig. 2 could be mounted on the wiper motor to one side of the control valve and have its piston connected to the coupler slide 153 to move it. With the suction supply in communication with the spring chamber 171 of the pneumatic motor 150 through conduit 158, the outside air will unseat the check valve 172 and act upon the adjacent side of the diaphragm to move it in a valve opening direction to bring the control valve and the slide to the positions of Fig. 22. Following the washer operation and the breaking of the electric circuit, the spring 170 will retract the wiper control valve 152 in a retarded manner as regulated by a bleed valve 173, the spring acting through the link 169, the slide 153, the armor 160 and its inclosed wire 159 with which it has frictional contact. Toward the end of the retraction the diaphragm will move against the bleed valve to open it fully for a quicker final movement to accelerate the wiper parking action. The lightly pressed pawl 154 will readily yield to the camming action of the corner portions 167 of the valve and slide when being pulled to a wiper arresting position.

In each form of the invention shown, the washer and wiper jointly are brought into operation substantially concurrently, or in a sequential order, by the manipulation of a single control with the result that the washing and wiping cycles overlap to afford a wet scrubbing action and a final dry wiping of the glass without further attention by the motorist. The wiper is thereby rendered self-starting and is likewise automatically arrested. By maintaining the wiper operation after the termination of the solvent spray, the glass may be wiped dry. Upon the termination of the washing action, the control valve of the wiper motor will automatically function to arrest or park the wiper at the lower side of the windshield. The related actions take place automatically and follow a sequential order to the end that the device will both turn on the wiper, deliver the solvent, wipe dry the glass and arrest and park the wiper. The springs 46, 110 and 170 each serves to effect the automatic parking of the wiper and in this connection it will be noted that in Fig. 20 the bleed valve 173 is finally opened to accelerate the parking cycle and thereby preclude the control valve slowing perceptibly as it moves off the running port and onto the parking port in the customary manner.

The entire action is achieved through the coordinator by a single manipulation of one control alone. The power controls 9, 85, 120—121, 152, for the wiper motors have primary controls or actuators 14, 108, 156, for sole wiper use and secondary controls or actuators 21, 76, 162, for washer coordinating use, these latter being common to both systems or units to set them jointly in operation. The coordinator provides a coupler for the controls of the two systems by which their conjoint use is secured in a practical manner while still permitting the independent use of the more important wiper system.

In the embodiment disclosed in Figs. 1 through 4, the wiper unit has a control 9 operated by a primary actuator 14, and its related parts, and a secondary actuator serving in the capacity of a coordinator and responsive to the washer unit control 21 and its associated parts. In the modification disclosed in Figs. 19 through 23, the wiper unit has its control 152 operable by similar primary and secondary actuators, with the secondary actuator functioning in the capacity of a coordinator. In the embodiment disclosed in Figs. 5 through 18 the wiper unit control 85 has a primary control 108, and its associated parts, and a secondary actuator in the form of the coordinating transmission between the washer control and the wiper control, and such transmission is responsive to the washer control to overlap the washing and wiping cycles. In each of these disclosures the coordinating mechanism embodies a coupler for detachably connecting the wiper control in a manner to enable sole wiper operation.

Figure 13:
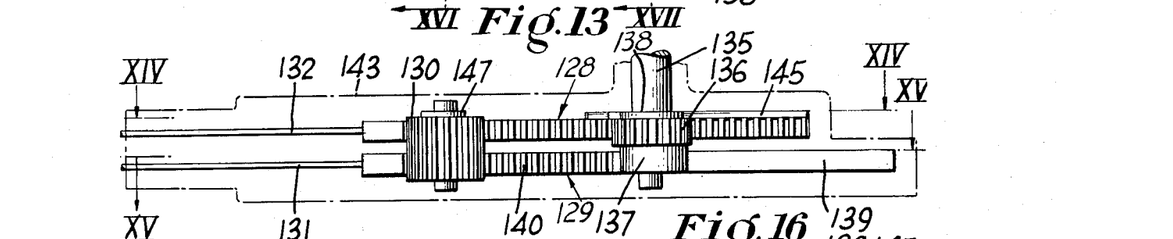
Fig. 13 is a diagrammatic showing of another modification.
Figure 14:
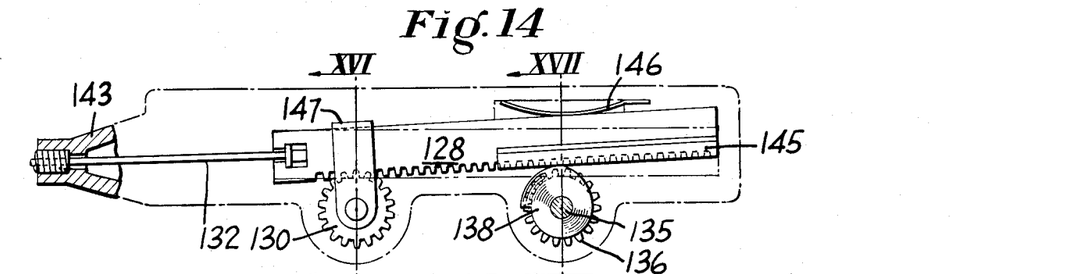
Figs. 14 and 15 are sectional views about on lines XIV—XIV and XV—XV of Fig. 3.

In the embodiments of Figs. 5 through 17, the rack-displacing cam and segmental gear unit serve as a selector for disrupting the coordinator and bringing the wiper solely into function. The disruption is achieved by the two racks so arranged as to move in unison upon a meshing gear which connects the racks to cause one to move the other part of the time and to cause one of the racks only to move at other times, whether by camming or otherwise providing for the disengagement of one of the racks. The hand turned shaft may have a mutilated pinion movable into mesh with a tangentially disposed rack as shown in Figs. 6, 11 and 12, or the rack may be lifted from the pinion as shown in Fig. 13 so that when the meshing relationship is restored by turning the cam 138 from its rack supporting position the rack will move radially into mesh with the teeth of the rotating pinion and thereby facilitate the meshing action when it is desired to apply solvent into the path of the wiper that is already operating at a given speed, this being accomplished without disturbing the wiper speed.

The foregoing description has been given in detail without thought of limitation since the inventive principles involved are capable of assuming other physical embodiments without departing from the spirit of the invention and the scope of the appended claims.

What is claimed is:

1. A windshield cleaner comprising a wiper system including a wiping blade and a connected motor with a manual control, a washer system including a delivery nozzle and a connected pump with a manual control, and a coordinating control coupler operatively connecting one control to the other to be actuated thereby for concurrent operation of both systems to release fluid with the movement of the blade of the wiper, said coupler including a disconnect unit operable to enable the independent continuance of the wiper system, and means automatically arresting the continued wiper operation.

2. A windshield cleaner comprising a wiper system including a wiping blade and a connected motor with a manual control, a washer system including a delivery nozzle and a connected pump with a manual control, said pump having a delivery stroke and a recharging stroke, a coordinating control coupler operatively connecting one control to the other for initiating concurrent operation of the wiper system at the start of the delivery stroke, said coupler having relatively movable parts each connected by a flexible transmission to a respective control, with means enabling the independent operation of one system or the joint use of both systems during such delivery stroke, and means operable during the joint use for automatically arresting the wiping blade after the delivery stroke.

3. A windshield cleaner comprising a wiper system including a wiping blade and a connected motor with a manual control, a washer system including a delivery nozzle and a connected pump with a manual control, a coordinating control coupler operatively connecting the wiper control to the other and selectively operable for either the conjoint use of both systems or the sole use of one system, said coupler having relatively movable parts each connected to a respective control and means operable to detachably connect said parts to secure such conjoint use or sole use, said washer system having a cycle of operation of shorter duration than that of the wiper system and the wiper system having an independent action following the cessation of the washer delivery, and means operable thereafter to automatically arrest the wiping blade.

4. A windshield cleaner comprising a wiper system having a control with a hand actuator, a washer system having a washing cycle of limited duration and including a pump having a foot actuator, an interconnecting system coupler operatively connecting the foot actuator to the control as a secondary actuator for the latter and operable to give conjoint use of both systems by and upon the operation of the foot actuator alone and to continue the operation of the wiper system after the washing cycle by holding the foot actuator operative, and arresting means operable automatically upon the release of the foot actuator to arrest the wiper system.

5. A windshield cleaner comprising a wiper system having a hand actuator and a foot actuator, a washer system operated by the foot actuator, an interconnecting coupler selectively operable to give either conjoint use of both systems by the foot actuator or independent use of the wiper system by the hand actuator, means predetermining the period of operation of the washer system, and means operable automatically to arrest the wiper system following the washer operation.

6. A windshield cleaner comprising a wiper system having a hand control, a washer system having a cycle of limited extent and provided with a foot control, and an interconnecting coupler, said hand control operable to secure an independent actuation of the wiper system, said coupler including a connector normally inoperative but responsive to the washer control and operable to connect both systems for conjoint use, and means operable automatically to arrest the wiper system following the washer system operation.

7. A windshield cleaner comprising a wiper system, a washer system, an interconnecting system coupler operable to give conjoint use of both systems with the washer operation being predetermined, a manual control selectively operable to secure an independent actuation of the wiper system, said coupler including a connector normally inoperative to enable such independent actuation but operable to connect both systems for such conjoint use, and a time delay action operable to retard the movement of the connector to its inoperative position for securing wiper operation following the washer operation.

8. A windshield cleaner comprising a wiper system having a control, a washer system having a control, an interconnecting system coupler interposed between and operatively connecting the two controls to give conjoint use of both systems, and means inedpendent of the washer system operable automatically to arrest the wiper system following the washer operation, said coupler having a selector with one part operable to render the coupler inoperative and a second part operable to actuate the control of the wiper system to operate the latter.

9. In a windshield cleaner system, a wiper element, a motor connected thereto for operating the same, motor control means, separably fixed and independently selective actuators remote from each other for actuating the control means, each actuator comprising a mechanism to turn on and off the wiper, one of said actuators being manually adjustable for continuous wiper operation and including means to automatically connect itself to the control means when operated and to automatically sever the connection between the control means and the other wiper actuator to render it temporarily inoperative, and common operating means for so disconnecting said one actuator and establishing the operative relation with the other actuator.

10. A windshield clearing system for use with a solvent containing reservoir, comprising a power driven pump unit connectable to the reservoir and operable to deliver solvent onto an associated windshield for an interval and then stopping, a power driven wiper unit operable to wipe the windshield, a control for the pump unit, a primary control for the wiper unit, and a secondary control for the wiper unit under the control of the pump unit control to actuate the wiper unit when the pump unit control is operated and to automatically arrest the wiper unit after the pump unit has stopped.

11. In a windshield cleaner system, a wiper element, a motor connected thereto for operating the same, a motor control, separably fixed and independently selective actuators remote from each other for actuating the control, each actuator comprising a mechanism to turn on and off the wiper, means operable to automatically connect one actuator to the control and to render the connection to the other actuator inoperative, common operating means for so actuating said connecting and disconnecting means, and means operable to arrest the wiper automatically after the actuation of said other actuator.

12. A windshield cleaner having a wiper, a washer, a power unit operable to actuate the wiper, a control for the power unit, an actuator for the control accessible for hand actuation, a second actuator for the control accessible for foot actuation, coordinating means operatively connecting the control and the washer for actuating the wiper and washer jointly, and means automatically arresting the wiper after the washer ceases operation.

13. A windshield cleaner having a washer unit operable for a time interval, a wiper and means for actuating the same, and a control for the wiper, said control having two mechanisms for its actuation, each being subejct to manual operation, one mechanism operable for turning the wiper on and off, the other mechanism including a resilient motor and means for operating said washer unit conjointly with said control, said motor being energized when said other mechanism is actuated, said other mechanism being automatically operable by said motor for turning the wiper off after the washer unit has completed its operation.

14. A windshield clearing system comprising a washer unit having an operative cycle of definite duration including a pump having a control, a wiper unit including a motor having a control, and a time-controlled unit connected to the wiper control to arrest the wiper unit after a predetermined time interval beyond the cycle of operation of the washer unit, said time unit connected for being set in operation by said washer control.

15. A windshield clearing system comprising a washer unit including a suction actuated pump having a control, a wiper unit including a suction actuated motor having a control, and an auxiliary suction motor under the control of the pump control and connected to the motor control for operating the wiper unit when the washer unit is energized.

16. A windshield cleaning system comprising a washer unit including means for spraying a solvent onto an associated windshield for a time interval and than stopping, a wiper unit including a motor and a control therefor, a common control operable to set both units in operation for conjoint operation, and means operable automatically to arrest the two units in a sequential order that prolongs the wiper operation beyond the washer operation.

17. A windshield cleaner having a wiper unit and a washer unit each having a control, said washer unit having a predetermined period of operation, a coordinating disconnect interposed between and detachably connecting the two controls for joint operation of both units and operable for detaching the wiper unit for independent actuation of the wiper unit, and hold-over means for the wiper unit operable to extend the wiper operation beyond the period of washer operation when jointly used.

18. A windshield cleaner having a wiper unit and a washer unit each having a control, said washer unit having a predetermined period of operation, a coordinating disconnect interposed between and detachably connecting the two controls for either joint operation of both units or an individual actuation of the wiper unit, and hold-over means for the wiper unit operable to extend the wiper operation beyond the period of washer operation when jointly used, said controls for the two units being combined in a unitary body and serving as a support for the hold-over means.

19. A windshield cleaner having a wiper unit and a washer unit each having a control, said washer unit having a predetermined period of operation, a coordinating disconnect interposed between and detachably connecting the two controls for either joint operation of both units or an individual actuation of the wiper unit, and hold-over means for the wiper unit operable to extend the wiper operation beyond the period of washer operation when jointly used, said wiper unit having a motor supporting its control and the coordinating disconnect together with the hold-over means for mounting as a unit.

20. A windshield cleaner having a wiper unit and a washer unit each having a control, a coordinating disconnect interposed between and detachably connecting the two controls for joint actuation, said disconnect comprising a wiper rack and washer rack interconnected by a meshing pinion and including a selector operable to disengage one rack from the pinion to enable independent unit actuation, and means operable automatically to arrest the wiper unit when jointly used.

21. In a windshield clearing system, a wiper unit having a control, a pump unit in the form of a bellows having a plunger section supported by a distensible liquid-confining wall section, a force multiplying foot lever bearing upon the plunger section for depressing the latter to subject a confined body of liquid to a wall-distending pressure, transmission means operatively connecting the lever to the wiper control to energize the wiper unit and pump unit for conjoint operation, and means operable automatically to hold the lever depressed to continue the operation of the wiper unit while the distended wall section continues to discharge the pressure subjected liquid onto an associated windshield.

22. A windshield cleaner comprising a wiper system having a wiper stroking back and forth, a washer system having means for applying a liquid solvent to a windshield surface while the wiper is stroking and then stopping the solvent application, an inter-connecting system coupler dependent upon the setting of the washer system in operation and operable to start the wiper system in operation to give a period of conjoint use of both systems, control means selectively operable either to set the washer system in operation and thereby render the coupler operative or to secure an independent actuation of the wiper system alone, and time-controlled means responsive to washer system operation and operable to continue the stroking of the wiper for a time interval following the period of conjoint use and after stopping of the solvent application by the washer system.

23. A windshield cleaning system comprising a washer unit having an operative cycle of definite duration and including a pump having a control, a wiper unit including a motor having a control, and a time-controlled unit energized by said washer unit and connected to the wiper control to start the wiper unit and continue the wiping operation for a predetermined time interval after the washing operation.

24. A windshield cleaning system comprising a washer unit including a suction actuated pump having a control, a wiper unit including a suction actuated motor having a control, an auxiliary suction motor under the control of the washer unit and connected to the motor control for operating the wiper unit when the washer unit is energized, and spring means acting to restore the motor control after the washer unit is deenergized.

25. A windshield cleaner comprising a wiper system having a control, a washer system having a cycle of limited duration and provided with a foot actuator, and an inter-connecting system coupler operatively connecting the washer system to the wiper system and including a flexible power transmitting member connected to the control to render the wiper system operative by actuating the foot actuator for a period of conjoint use and including means operable through said power transmitting member for automatically arresting the wiper system subsequent to the completion of the washer system operation.

26. A windshield clearing system according to claim 10, wherein the primary control has a power control device and an actuator therefor, and the scondary control includes a power unit energized by the pump unit and has an actuator operatively connected to the control device to start the wiper unit.

27. A windshield clearing system according to claim 26, wherein resilient means are provided to return the control device to arrest the wiper unit after said power unit is deenergized.

28. A windshield clearing system according to claim 27, wherein the power unit comprises a fluid motor having a pressure responsive member connected to the control device and movable by a pressure differential against said resilient means, said fluid motor having a bleed passage for regulating the return movement of said pressure responsive member by said resilient means to prolong the wiper operation.

29. A windshield clearing system according to claim 28, wherein the power control device comprises a valve movable from a running position to a wiper parking position, and means are provided in the bleed passage to accelerate the final portion of the return movement of the pressure responsive member to effect a more rapid movement of the valve for arresting the wiper unit.

30. A windshield clearing system according to claim 26, wherein the wiper unit is electrically operated, and said control device is in the form of an electric switch.

31. A windshield clearing system according to claim 26, wherein the primary actuator is connected directly to the control device for moving it back and forth between two positions to start and stop the wiper unit, and said secondary actuator is operable to move the control device to its starting position, the control device being free of the secondary actuator against return movement by the latter, and a coordinating connector between the two actuators is operable to return the control device by said secondary actuator to arrest the wiper unit.

32. A coordinated windshield cleaner comprising a wiper unit having a control for starting and stopping the unit, a washer unit having a control, primary and secondary actuators for the wiper control, one of said actuators being operatively connected to the wiper control to move it to its starting position only and the other actuator being directly connected to the wiper control for moving it to and from its starting position independently of said one actuator, said secondary actuator being operatively connected to the washer control for responding thereto in bringing the two units into overlapping cycles of operation, and coordinator means operatively connecting said one actuator to said other actuator to establish a driving connection therebetween for returning the wiper control to its stopping position, by said one actuator.

33. A windshield cleaner system comprising means for spraying a solvent onto an associated windshield for an interval and then stopping, a wiper and a motor for actuating the wiper, control means for said motor, and means interconnecting said control means and said solvent spraying means for operating said spraying means and said wiper motor conjointly to operate said wiper when the solvent is being sprayed onto the windshield and including means operable automatically to arrest the wiper after said spraying means has stopped.

34. A windshield cleaning system according to claim 16, wherein the common control is operable to initially energize the washer unit for effecting a spray onto such a windshield prior to the wiper unit becoming effective.

35. A windshield cleaner according to claim 25, wherein the washer system has an elastic bellows, the foot actuator is in the form of a pedal pivotally mounted on the bracket adjacent the bellows and overlying the same for compressing the bellows upon depression of the pedal to deliver washing fluid onto an associated windshield, said pedal having connection with said flexible power transmitting member for so rendering the wiper system operative upon depression of the pedal.

36. A windshield cleaner system comprising means for spraying a solvent onto an associated windshield for an interval and then stopping, a wiper, control means for actuating the wiper, and means interconnecting said solvent spraying means and said wiper control means for controlling the operation of said spraying means and said wiper control means so that solvent is sprayed onto the windshield and spread over the surface thereof by the wiper and including means operable automatically to arrest the wiper after said spraying means has stopped.

References Cited in the file of this patent

UNITED STATES PATENTS

| | | |
|---|---|---|
| 193,145 | Collins | July 17, 1877 |
| 224,370 | Wilson | Feb. 10, 1880 |
| 1,183,043 | Scott | May 16, 1916 |
| 2,162,985 | West | June 20, 1939 |
| 2,206,814 | Horton | July 2, 1940 |
| 2,323,470 | Horton et al. | July 6, 1943 |
| 2,617,136 | Rappl | Nov. 11, 1952 |

FOREIGN PATENTS

| | | |
|---|---|---|
| 465,681 | Canada | of 1950 |
| 466,827 | Canada | of 1950 |